United States Patent
Chen et al.

(10) Patent No.: US 10,152,683 B2
(45) Date of Patent: Dec. 11, 2018

(54) DEMAND RESPONSE EVENT ASSESSMENT

(71) Applicant: FUJITSU LIMITED, Kawasaki-shi, Kanagawa (JP)

(72) Inventors: Wei-Peng Chen, Fremont, CA (US); Sanam Mirzazad Barijough, Mountain View, CA (US)

(73) Assignee: FUJISTU LIMITED, Kawasaki (JP)

( * ) Notice: Subject to any disclaimer, the term of this patent is extended or adjusted under 35 U.S.C. 154(b) by 476 days.

(21) Appl. No.: 14/161,375

(22) Filed: Jan. 22, 2014

(65) Prior Publication Data
US 2015/0206083 A1   Jul. 23, 2015

(51) Int. Cl.
| G06Q 10/00 | (2012.01) |
| G06Q 10/06 | (2012.01) |
| G06Q 50/06 | (2012.01) |
| G06Q 30/02 | (2012.01) |

(52) U.S. Cl.
CPC ....... G06Q 10/06313 (2013.01); G06Q 10/00 (2013.01); G06Q 50/06 (2013.01); G06Q 10/06 (2013.01); G06Q 30/0206 (2013.01); Y04S 20/224 (2013.01)

(58) Field of Classification Search
CPC .. G06Q 10/06313; G06Q 10/00; G06Q 50/06; G06Q 10/06; G06Q 30/0206; Y04S 20/224
See application file for complete search history.

(56) References Cited

U.S. PATENT DOCUMENTS

| 5,924,486 A | * | 7/1999 | Ehlers | F24F 11/006 |
| | | | | 165/238 |
| 6,519,509 B1 | * | 2/2003 | Nierlich | H02J 3/008 |
| | | | | 700/286 |
| 8,019,697 B2 | | 9/2011 | Ozog | |
| 2003/0171851 A1 | * | 9/2003 | Brickfield | H02J 3/008 |
| | | | | 700/286 |

(Continued)

FOREIGN PATENT DOCUMENTS

| JP | 2008-295193 | 12/2008 |
| WO | 2013/039554 A1 | 3/2013 |
| WO | 2013/179876 A1 | 5/2013 |

OTHER PUBLICATIONS

Albadi MH and El Saadany EF, 2008, Electric Power Systems Research, Electric Power Systems Research, 78, pp. 1989-1996.*

(Continued)

*Primary Examiner* — Matthew S Gart
*Assistant Examiner* — Stephen S Swartz
(74) *Attorney, Agent, or Firm* — Maschoff Brennan

(57) ABSTRACT

A method of demand response (DR) assessment may include reading energy economics data from a third party for an interval of a DR event period. The energy economics data may include a day-ahead demand, a day-ahead locational marginal pricing (LMP), and a real-time LMP. The method may also include estimating a real-time energy demand for the interval. Based on the energy economics data and the estimated real-time energy demand, the method may also include determining a demand imbalance for the interval. The method may also include calculating a cost of a DR event that exploits the demand imbalance. The method may also include selecting an energy curtailment request amount for the interval that optimizes profitability of the DR event.

18 Claims, 5 Drawing Sheets

(56) References Cited

U.S. PATENT DOCUMENTS

| | | | | |
|---|---|---|---|---|
| 2003/0197426 | A1* | 10/2003 | Carson | H04B 3/54 307/40 |
| 2005/0234600 | A1* | 10/2005 | Boucher | G06Q 30/02 700/286 |
| 2009/0048717 | A1* | 2/2009 | Richard | H02J 3/14 700/295 |
| 2009/0048718 | A1* | 2/2009 | Richard | G06Q 10/06312 700/296 |
| 2010/0076613 | A1* | 3/2010 | Imes | G06Q 50/06 700/287 |
| 2010/0106342 | A1 | 4/2010 | Ko et al. | |
| 2010/0179704 | A1* | 7/2010 | Ozog | G06Q 10/06315 700/291 |
| 2010/0179862 | A1* | 7/2010 | Chassin | G06Q 10/06 705/412 |
| 2010/0332373 | A1* | 12/2010 | Crabtree | G06Q 50/06 705/37 |
| 2011/0153102 | A1 | 6/2011 | Tyagi et al. | |
| 2011/0196546 | A1* | 8/2011 | Muller | H02J 3/383 700/295 |
| 2011/0258018 | A1 | 10/2011 | Tyagi et al. | |
| 2011/0288905 | A1* | 11/2011 | Mrakas | G06Q 10/06 705/7.25 |
| 2013/0013121 | A1* | 1/2013 | Henze | G06Q 10/04 700/291 |
| 2014/0039709 | A1* | 2/2014 | Steven | G06Q 10/06 700/291 |
| 2014/0172503 | A1* | 6/2014 | Hammerstrom | G06Q 30/0206 705/7.31 |
| 2014/0222225 | A1* | 8/2014 | Rouse | H02J 13/0079 700/291 |
| 2014/0277797 | A1* | 9/2014 | Mokhtari | G06Q 50/06 700/291 |
| 2015/0081413 | A1 | 3/2015 | Okabe et al. | |
| 2015/0100164 | A1* | 4/2015 | Craig | G05B 15/02 700/276 |
| 2015/0295415 | A1* | 10/2015 | Narayan | G06Q 10/04 702/181 |

OTHER PUBLICATIONS

Wang, Rui_Kandasamy, Nagarajan_Nwankpa, Chika_Kaeli, David, 2013, Datacenters as Controllable Load Resources in the Electricity Market, IEEE Computer Society, pp. 176-185.*

Fahrioglu, Murat_Alvarado, Fernando_2000, Designing Incentive Compatible Contracts for Effective Demand Management, IEEE Transactions on Power Systems, vol. 15, No. 4, pp. 1255-1260.*

European Search Report for EP Application No. 14 18 2834 dated Apr. 23, 2015.

AEP Ohio gridSMART Demonstration Project, https://www.aepohio.com/save/demoproject/about/Default.aspx, retrieved Jan. 22, 2014.

European Search Report for EP Application No. 14 182 834.3 dated Dec. 19, 2016.

EP Decision to Refuse Application in application No. 14182834.3 dated Oct. 2, 2018.

EP Oral Proceedings canceled in application on. 14182834.3 dated Sep. 27, 2018.

* cited by examiner

Fig. 3

Parameters 350 — 300

| Customer ID 302 | Maximum Potential Curtailment (kW) 304 | Likelihood Of Participation (%) 306 | Reliability (%) 308 | Average Past Performance (%) 310 | Past Curtailment Performance (kWh) 312 | Estimated Curtailment (kW) 314 | DR Cost ($) 316 | Number Of Events Were Notified 318 | Previously Called 320 | Location (Zone) 322 | Control Device Type 324 |
|---|---|---|---|---|---|---|---|---|---|---|---|
| 1 302A | 2.3 304A | 90 306A | 85 308A | 70 310A | 1.50 312A | 1.23 314A | 2.00 316A | 30 318A | No 320A | 1 322A | Automated 324A |
| 2 302B | 1.2 304B | 95 306B | 90 308B | 75 310B | 0.78 312B | 0.77 314B | 2.10 316B | 50 318B | No 320B | 1 322B | Automated 324B |
| 3 302C | 2.1 304C | 67 306C | 62 308C | 47 310C | 1.37 312C | 0.41 314C | 1.85 316C | 20 318C | Yes 320C | 2 322C | Manual 324C |
| 4 302D | 4.2 304D | 78 306D | 73 308D | 58 310D | 2.74 312D | 1.39 314D | 1.90 316D | 15 318D | No 320D | 2 322D | Manual 324D |
| 5 302E | 2.6 304E | 45 306E | 40 308E | 25 310E | 1.70 312E | 0.12 314E | 2.25 316E | 62 318E | Yes 320E | 1 322E | Automated 322E |

DEMAND RESPONSE EVENT ASSESSMENT

FIELD

The embodiments discussed herein are related to demand response event assessment.

BACKGROUND

Utilities incentivize curtailment of energy usage during certain high load periods to increase the ability of the utilities to meet a larger demand or to minimize production costs. For example, in summer months, peak energy usage may occur on hot days in the late afternoon. A utility may offer an incentive to a factory to reduce energy usage during the late afternoon. In response, the factory may delay a high load production run until later in the evening, turn down the air-conditioning in the factory, or otherwise reduce energy use. In this manner, the utility may increase its ability to meet energy demands during the peak energy usage and/or avoid producing or purchasing additional energy to meet the energy demands.

The curtailment in energy usage during peak or high load periods may be referred to generally as demand response (DR). The energy usage curtailment during a specified time period may be referred to as a DR event. DR events generally occur when a utility expects a high demand and asks customers to reduce or curtail energy usage. When a customer reduces its energy usage by an agreed-upon amount, the utility may provide an incentive to the customer. Some DR systems include DR aggregators. The DR aggregators may mediate communication between utilities and customers. The DR aggregators generally have an agreement with the utilities to coordinate with the customers and implement DR events.

In some DR systems, the DR aggregators and/or the utilities issue the DR events a day or more in advance. Accordingly, the DR events are based on data available prior to the issuance of the DR events. Additionally, the DR events may involve mostly large commercial and industrial (C&I) customers. For example, if the DR event is to occur on July 2nd, the DR aggregator and/or the utility may issue the DR event on July 1st. The coordination of the DR event among C&I customers participating in the DR event may occur on July 1st to ensure the C&I customers have sufficient time to coordinate curtailment according to the DR event. Additionally, the decision to issue the DR event may be made according to data pertaining to the C&I customers that is available on July 1st.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of demand response (DR) assessment may include reading energy economics data from a third party for an interval of a DR event period. The energy economics data may include a day-ahead demand, a day-ahead locational marginal pricing (LMP), and a real-time LMP. The method may include estimating a real-time energy demand for the interval. Based on the energy economics data and the estimated real-time energy demand, the method may include determining a demand imbalance for the interval. The method may also include calculating a cost of a DR event that exploits the demand imbalance. The method may also include selecting an energy curtailment request amount for the interval that optimizes profitability of the DR event.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3 illustrates an example data table that may be implemented in the computing device of FIG. 2.

DESCRIPTION OF EMBODIMENTS

Some embodiments described herein relate to demand response (DR) event assessment. Based on the DR event assessment, a utility or a DR aggregator may determine whether to issue a DR event and which customers or sites to include in the DR event. The DR event assessment may be at least partially based on real-time data and may be performed for one or more intervals of a DR event period.

An example embodiment may include a method of DR event assessment. The method may include reading energy economics data from a third party for an interval of a DR event period. The energy economics data may include a day-ahead demand, a day-ahead locational marginal pricing (LMP), and a real-time LMP. The method may include estimating a real-time energy demand for the interval by aggregating meter readings. Alternatively or additionally, the method may include estimating a real-time energy demand for the interval by the meter readings at the aggregated points such as feeders or substations. Based on the energy economics data and the estimated real-time energy demand, the method may include determining a demand imbalance for the interval. The method may also include selecting an energy curtailment request amount for the interval that optimizes profitability of the DR event. The selection may be based on a cost function and a real-time price forecasting function that each takes into consideration the energy curtailment request amount.

In this and other embodiments, in response to the curtailment request amount equaling zero, the DR event may not be issued. Alternatively, in response to the curtailment request amount not equaling zero, the method may include identifying a subset of customers capable of curtailing, in aggregate, the curtailment request amount. Identification of the subset may be performed based upon historical DR event participation data (historical data). The subset of customers may be notified of the DR event and feedback may be collected from the subset of customers regarding compliance with the DR event. Based on the feedback, potential energy curtailment for the DR event may be estimated and another subset of customers may be reevaluated for the interval and for another interval of the DR event period.

Figure 1A:
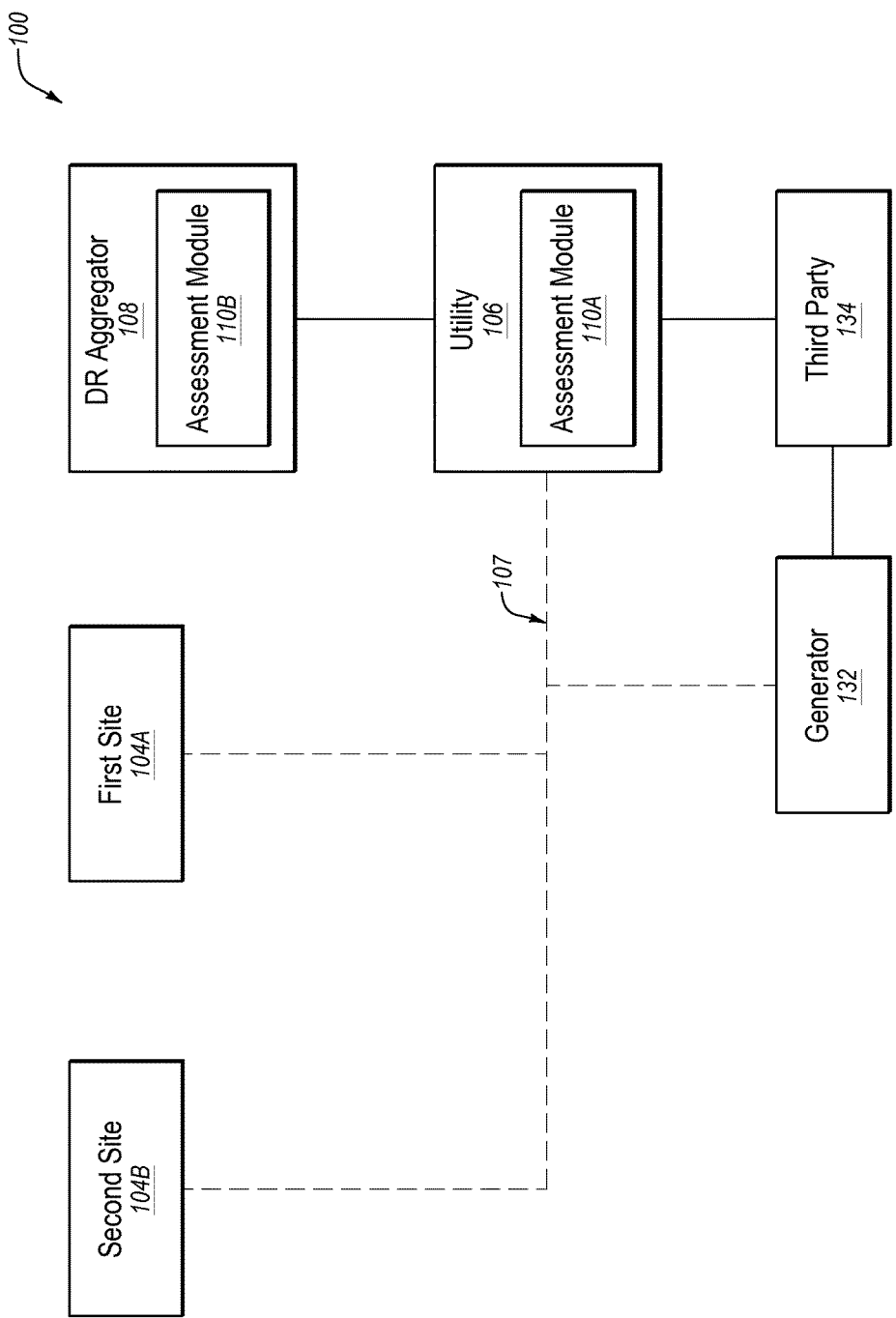
FIGS. 1A and 1B illustrate an example resource distribution system.
Figure 1B:
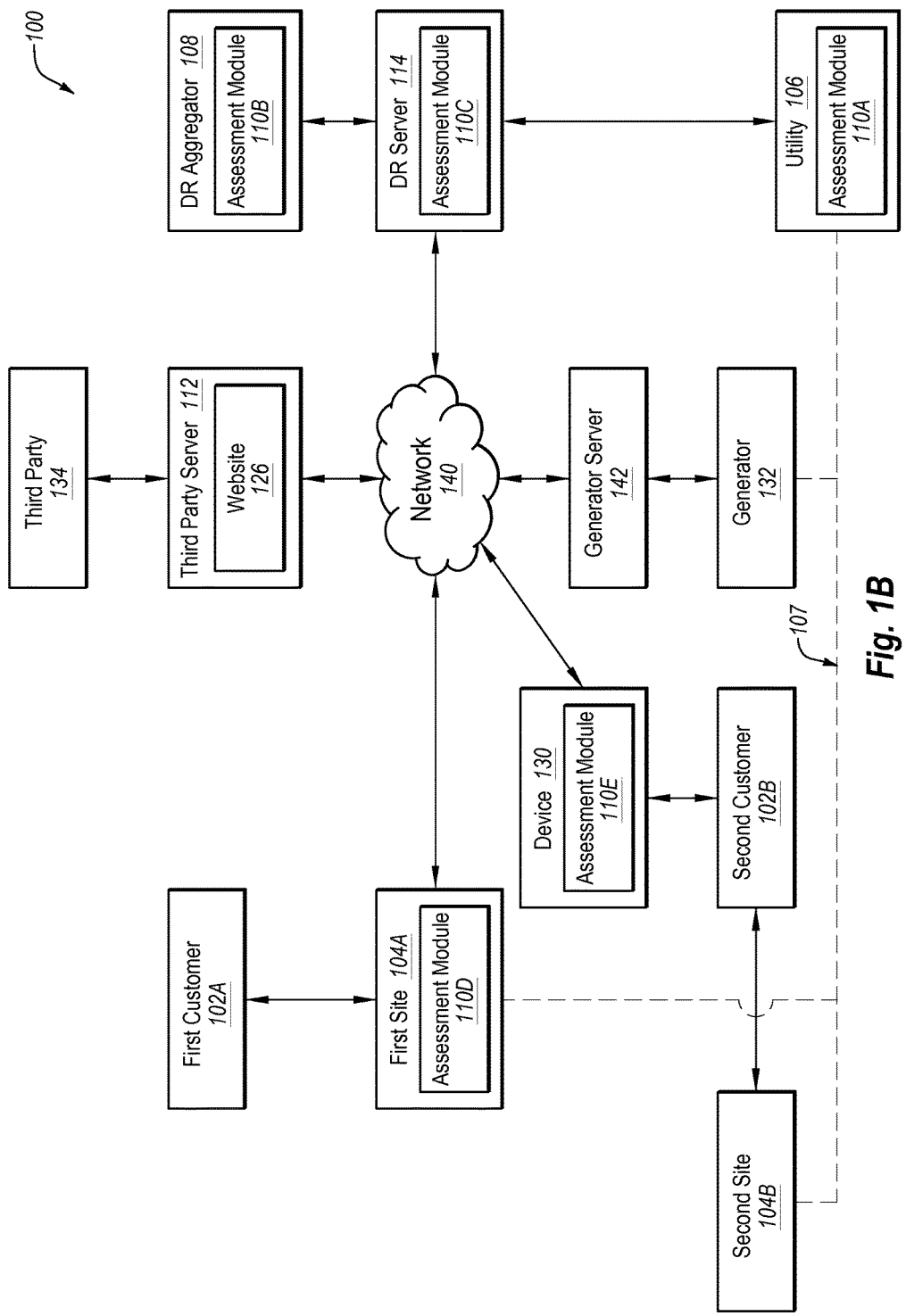

FIGS. 1A and 1B illustrate an example resource distribution system (distribution system) 100, arranged in accordance with at least one embodiment described herein. The distribution system 100 may be configured to enable DR event assessment. The DR event assessment may be conducted in real time or substantially real time. For instance, the DR event assessment may be based on real-time or substantially real-time resource demand and/or resource prices. As used herein the term "substantially real time" is meant to indicate that the resource demand, the resource prices, and the DR event assessment may be estimated, ascertained, measured, etc. without a material delay or according to one or multiple standard or agreed-to intervals. The DR event assessment may enable selection of an optimal curtailment request amount for a DR event, identification of a subset of the sites 104 that may be capable of curtailing the optimal curtailment request amount during the DR event, estimation of profitability of the DR event, and whether to issue the DR event.

With reference to FIG. 1A, the distribution system 100 may include a utility 106, a DR aggregator 108, sites 104A and 104B (generally, site 104 or sites 104), a generator 132, and a third party 134. The utility 106 may be configured to supply a resource such as electricity, gas, water, or another resource to the sites 104. The distribution system 100 is described herein with particularity in which the utility 106 supplies electricity to the sites 104.

In alternative embodiments, the distribution system 100 may provide another resource to the sites 104. In these alternative embodiments, the relationships between the sites 104, the utility 106, the DR aggregator 108, and the generator 132 may be different without departing from the scope of this disclosure.

Distribution of the resource to the sites 104 may be via a distribution channel, represented in FIGS. 1A and 1B by item number 107 (hereinafter, "distribution channel 107"). The distribution channel 107 may include one or more substations, distribution wiring, piping, pumps, tanks, or any other component on which or through which a resource may be transferred between the utility 106 and the sites 104. In the depicted embodiment, the distribution system 100 may include one distribution channel 107. In some embodiments, the distribution system 100 may include multiple distribution channels 107. DR event assessment may be performed with respect to a specific distribution channel (e.g., the distribution channel 107) or a subset of distribution channels.

The utility 106 may include any load serving entity (LSE) involved in production, transmission, and/or distribution of the resource. The utility 106 may be publicly owned or privately owned. Some examples of the utility 106 may include, but are not limited to, a power company and an energy cooperative. The utility 106 may be configured to identify a DR event and set one or more terms for the DR event such as incentives, a DR event period, and overall resource curtailment. In the depicted embodiment, the utility 106 may include an assessment module 110A. The assessment module 110A may be configured to perform one or more operations of DR event assessment as described herein.

The sites 104 may include buildings, residences, structures, equipment, or other objects that consume the resource. In particular, in some embodiments, the sites 104 may include private residences, small and medium businesses (SMB), commercial and industrial (C&I) businesses, or some combination thereof.

The distribution system 100 may include the DR aggregator 108. The DR aggregator 108 may act as an intermediary between the utility 106 and the sites 104 to coordinate implementation of DR events. In particular, the DR aggregator 108 may coordinate DR events such that a cumulative energy usage curtailment of the sites 104 is sufficient to meet an overall energy usage curtailment of a DR event. In some embodiments, an incentive offered by the utility 106 may be received by the DR aggregator 108. The DR aggregator 108 may in turn offer some portion of the incentive to the sites 104 in exchange for participation in a DR event. The sites 104 or some subset thereof may be managed by the DR aggregator 108. The DR aggregator 108 may coordinate implementation of DR events by the sites 104 it manages.

The DR aggregator 108 may perform DR event assessment itself or cooperatively with the utility 106. For example, the DR aggregator 108 may include an assessment module 110B that may be configured to perform DR event assessment as described herein.

In the depicted embodiment, the DR aggregator 108 may act as an intermediary. However, inclusion of the DR aggregator 108 is not meant to be limiting. In some embodiments, the utility 106 may directly communicate with one or more of the sites 104. Additionally or alternatively, the utility 106 may directly communicate with one or more sites 104 and the DR aggregator 108 may communicate with one or more other sites 104.

The generator 132 may include any entity involved in the production and/or sale of the resource. Some examples of the generator 132 may include a power plant or another resource extraction and distribution plant. The generator 132 may connect to the distribution channel 107 as depicted in FIG. 1A or may connect to the utility 106, which may be connected to the distribution channel 107.

In some alternative embodiments, the generator 132 and the utility 106 may be a single entity or the utility 106 may include the generator 132. Additionally or alternatively, multiple generators may be connected to the distribution channel 107 from which the resource may be generated.

The third party 134 may include an entity that controls or manages exchange of the resource in the distribution system 100. The third party 134 may ensure the resource is properly allocated among the sites 104, enable a price of the resource to be set for the sites 104 and/or the distribution channel 107, and provide a market for the exchange of the resource. In embodiments in which the utility 106 supplies electricity to the sites 104, the third party 134 may include an independent system operator (ISO) or a regional transmission organization (RTO), for instance.

The distribution system 100 may at least partially enable implementation of DR events. The DR events may include DR event periods during which one or more of the sites 104 curtail resource usage. A DR event may be scheduled during periods of high demand, for example. By curtailing resource usage during periods of high demand, the utility 106 may meet the high demand without purchasing or otherwise generating or locating additional resource or may make available previously purchased resource for sale.

The utility 106 and/or the DR aggregator 108 may offer an incentive to participate in the DR events. The DR aggregator 108 and/or the utility 106 may implement any DR incentive program. The DR incentive program may include, but is not limited to, a capacity bidding program (CBP), a demand bidding program (DBP), a direct load control (DLC) program, a peak-time rebates (PTR) program, a time of use (TOU) program, a critical peak prices (CPP) program, and a real-time pricing (RTP) program. Specifically, in some embodiments, the sites 104 may include residential sites and the utility 106 and/or the DR aggregator 108 may implement a DLC program or a PTR program. In other embodiments, the utility 106 and/or the DR aggregator 108 may implement the DLC program or PTR program with respect to a first site 104A and another DR incentive program (e.g., DBP) with respect to a second site 104B.

In the distribution system 100, a price of the resource may vary based on demand over time. Accordingly, the assessment modules 110A and 110B may be configured to base the DR event assessment on the price and the demand of the resource. In particular, in some embodiments, the assessment modules 110A and 110B may be configured to base the DR event assessment on a real-time or substantially real-time price and demand of the resource.

In this and other embodiments, the price of the resource supplied to the sites 104 may be initially set in a day-ahead market and then changed in a real-time market. Resources are transferred at the day-ahead LMP in the day-ahead market. For example, once the utility 106 has agreed to purchase a particular amount of the resource at the day-ahead LMP from the generator 132, the utility 106 essentially controls the particular amount of the resource. The utility 106 may provide the particular amount of the resource to the sites 104 or may sell the particular amount of the resource.

The day-ahead market may set an LMP for a next operational day at hourly or another suitable interval. The day-ahead market may be based on a forecasted demand and a forecasted supply, which may be indicated by offers, demand bids, and bilateral transaction schedules, for instance. During the next operational day, surplus resources or make-up resources may be exchanged in substantially real time (e.g., at a five-minute interval before a current time) on the real-time market. The real-time market may be based on actual demand and actual supply. The prices may be set according to a location such as a location of the distribution channel 107 or one or more of the sites 104.

For example, the utility 106 may forecast that the sites 104 will use a first amount of the resource during a first period in the next operational day. The utility 106 may bid to purchase the first amount of the resource for the first period from the generator 132. The third party 134 may, in accordance with the bid (and other bids) submitted in the day-ahead market, set the day-ahead LMP for the distribution channel 107 or the sites 104. The utility 106 may then purchase the first amount of the resource from the generator 132 at the day-ahead LMP. During the next operational day, a demand imbalance may occur. The demand imbalance may occur because demand increases (e.g., the sites 104 increase usage above the first amount) or demand decreases (e.g., the sites 104 may decrease usage below the first amount). The third party 134 may change the price in real-time market. For instance, in response to the demand increasing, the third party 134 may set a real-time LMP of the resource higher than the corresponding day-ahead LMP. Likewise, in response to the demand decreasing, the third party 134 may set a real-time LMP of the resource lower than the corresponding day-ahead LMP.

When the demand imbalance involves an increase in demand, the utility 106 may have to purchase a make-up amount of the resource from the generator 132 at the real-time LMP. Alternatively, when the demand imbalance involves a decrease in demand, the utility 106 may be able to sell any surplus resource at the real-time LMP. Accordingly, the DR event assessment implemented by the assessment modules 110A and 110B may evaluate the cost of the DR event in relation to the real-time LMP of the resource. For example, the demand imbalance may result in the utility 106 purchasing a make-up amount of the resource. If it is less expensive to purchase the make-up amount than implement the DR event, the utility 106 may purchase the make-up amount. Additionally or alternatively, in some circumstances, there may not be a demand imbalance, but the real-time LMP of the resource may justify the utility 106 implementing a DR event to free some of the previously purchased resource that the utility 106 may sell.

In FIG. 1B, the distribution system 100 is illustrated as additionally including some example communication-enabled components (e.g., 130, 112, 114, 140, and 142) in addition to the sites 104, the generator 132, the DR aggregator 108, the utility 106, and the third party 134 described with reference to FIG. 1A. In the distribution system 100 as illustrated in FIG. 1B, the DR event assessment may be based on information communicated via a network 140. For example, day-ahead LMP, real-time LMP, and day-ahead demand (collectively, economics data) may be communicated in the distribution system 100. Additionally, based on the DR event assessment, the assessment module 110A of the utility 106 and/or the assessment module 110B of the DR aggregator 108 may implement a DR event by communicating information via the network 140. For example, a DR event notification may be communicated to the sites 104 and feedback may be collected from the sites 104 following the DR event notification through the network 140.

As depicted in FIG. 1B, the distribution system 100 may include a device 130, a generator server 142, a third party server 112, and a DR server 114. In the distribution system 100, the device 130, the generator server 142, the third party server 112, and the DR server 114 may communicate via the network 140. Additionally, in the distribution system 100, the assessment modules 110A-110E (generally, assessment module 110 or assessment modules 110) may be included the DR server 114, the utility 106, the DR aggregator 108, the device 103, the first site 104A, or some combination thereof. The assessment modules 110 may be configured to perform or enable performance of the DR event assessment. Additionally, the assessment module 110 may be configured to enable communication of the information used in the DR event assessment or in implementation of DR events based on the DR event assessment between the device 130, the generator server 142, the third party server 112, and the DR server 114 via the network 140. The network 140, the device 130, the generator server 142, the third party server 112, and the DR server 114 are described with reference to the assessment modules 110.

The network 140 may include a wired or wireless network, and may have numerous different configurations including, but not limited to, a star configuration, token ring configuration, or other configurations. Furthermore, the network 140 may include a local area network (LAN), a wide area network (WAN) (e.g., the Internet), and/or other interconnected data paths across which multiple devices may communicate. In some embodiments, the network 140 may include a peer-to-peer network. The network 140 may also be coupled to or include portions of a telecommunications network that may enable communication of data in a variety of different communication protocols.

In some embodiments, the network 140 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc. In some embodiments, the network 140 may enable communication, at least partially, of control commands to appliances, which may be included in the sites 104. The control commands may be formatted according to a standard-based protocol such as smart energy profile (SEP), Echonet Lite, OpenADR, or another suitable protocol (e.g., wireless fidelity (Wi-Fi), ZigBee, HomePlug Green, etc.).

The sites 104 may be associated with customers 102A and 102B (generally, customer 102 or customers 102). The customers 102 may manage or otherwise oversee resource consumption and/or curtailment of the sites 104. For example, the customers 102 may decide whether to participate in a DR event and affect operation of the sites 104 to curtail resource usage during the DR event. For example, in this and other embodiments, the first site 104A may include a residence and a first customer 102A may include an owner of the residence. The sites 104 may include multiple types of structures ranging from private residences to large industrial factories or office buildings.

Information communicated via the network 140 may be sent and received from the customers 102, the sites 104, the device 130, or any combination thereof. In the depicted embodiment, a second customer 102B may be associated with the second site 104B and the device 130. Information communicated via the network 140 may be communicated to the device 130, of which the second customer 102B may become aware. In response to information communicated to the device 130, the second customer 102B may affect operation of the second site 104B (or may not affect operation of the second site 104B). Additionally or alternatively, the first site 104A may send and receive information communicated via the network 140. The first customer 102A may then affect operation of the first site 104A based on the information.

In particular, in the depicted embodiment, the first site 104A may include the assessment module 110D and the device 130 may include the assessment module 110E. The assessment modules 110E and 110D may be configured to send and to receive information via the network 140. The information received by the assessment modules 110E and 110D may include DR event notifications, which may be communicated by the assessment module 110C of the DR server 114 in some embodiments. Additionally, the assessment modules 110E and 110D may be configured to enable interaction with the customers 102. For example, the assessment modules 110E and 110D may display some portion of the DR event notifications and may receive input from the customers 102. The input may be indicative of whether the customers 102 intend to participate in a DR event. Additionally or alternatively, the input may include a preference of the customers 102, a status of the device 130, or a status of the site 104, for example. The assessment modules 110E and 110D may then send a signal representative of the input to one or more of the DR server 114, the utility 106, and the DR aggregator 108 or the assessment modules 110A-110C included therein. Additionally, the assessment modules 110E and 110D may be configured to generate and communicate signals without input from the customers 102. For example, in response to reception of the DR event notification, the assessment modules 110E and 110D may be configured to transmit an acknowledgement signal to one or more of the DR server 114, the utility 106, and the DR aggregator or the assessment modules 110 included therein. Additionally or alternatively, one or more of the preference of the customers 102, the status of the device 130, and the status of the site 104 may be transmitted without input from the customers 102. The signals (e.g., the signals transmitted without input by the customers 102 and the signals representative of input from the customers 102) may be stored by the utility 106, the DR aggregator 108, the DR server 114, or another entity as historical data.

The device 130 and/or the sites 104 may include computing devices that include a processor, memory, and network communication capabilities. The network communication capabilities may include Internet (e.g., Wi-Fi) networking capabilities, BLUETOOTH®, 3G, 4G, LTE communication networking capabilities, or any combination thereof suitable for communication via the network 140. Some examples of the device 130 may include a laptop computer, a desktop computer, a tablet computer, a mobile telephone, a smart phone, a personal digital assistant (PDA), a mobile e-mail device, a portable game player, a portable music player, a television with one or more processors embedded therein or coupled thereto or other electronic device capable of accessing and communicating via the network 140. The sites 104 may include one or more of the example devices 130 or may include a server or another suitable computing device.

The generator server 142 may include hardware that includes a processor, memory, and communication capabilities. The generator server 142 may be communicatively coupled to the network 140 to send and receive data to and from one or more of the device 130, the first site 104A, the third party server 112, and the DR server 114 via the network 140. In the illustrated embodiment, the generator server 142 may be associated with the generator 132 described with reference to FIG. 1A. The generator server 142 may be configured to receive and/or calculate information related to supply and demand of the resource on the distribution channel 107. The generator server 142 may then communicate the information to the third party server 112 and/or the DR server 114. The information may be calculated and/or communicated continuously, periodically, randomly, pseudo-randomly, or on-demand.

The third party server 112 may include hardware that includes a processor, memory, and communication capabilities. The third party server 112 may be communicatively coupled to the network 140 to send and receive data to and from one or more of the device 130, the first site 104A, the generator server 142, and the DR server 114 via the network 140. In the illustrated embodiment, the third party server 112 may be associated with the third party 134 described with reference to FIG. 1A. The third party server 112 may be configured to receive, calculate, and/or publish information related to supply and demand of the resource on the distribution channel 107. The information may be received, calculated, and/or published continuously, periodically, randomly, pseudo-randomly, or on-demand. For example, the third party server 112 may be configured to receive economics information from the generator server 142 and the DR server 114. The third party server 112 may then calculate economics data and publish the economics data related to the distribution channel 107.

In some embodiments, the third party server 112 may be configured to host a website 126 that is accessible via the network 140. The third party server 112 may allow access to the website 126 by the DR aggregator 108 and/or the utility 106 via the DR server 114. The DR aggregator 108 and/or the utility 106 may accordingly access and/or interface with the website 126 via the DR server 114. The website 126 may provide a user interface to the DR aggregator 108 and/or the utility 106 accessing the website 126. In particular, the economics data may be accessible via the website 126. Additionally or alternatively, the third party server 112 may communicate the economics data to the DR server 114 continuously, periodically, randomly, pseudo-randomly, or on-demand.

The DR server 114 may include hardware that includes a processor, memory, and communication capabilities. The DR server 114 may be communicatively coupled to the network 140 to send and receive data to and from one or more of the device 130, the first site 104A, the generator server 142, and the third party server 112 via the network 140. In the depicted embodiment, the DR aggregator 108 and the utility 106 may be associated with the DR server 114. The DR server 114 may include the assessment module 110C. The assessment module 110C included in the DR server 114 may communicate with the assessment modules 110A and/or 110B to perform or cause the performance of the DR event assessment.

In some embodiments, the assessment modules 110A-110C may be configured to generate a DR event that exploits a demand imbalance that exists on the distribution channel 107. For example, the DR event may be configured to curtail the resource to avoid a purchase of the resource at the real-time price (e.g., LMP). Alternatively, the DR event may be configured to curtail the resource to create an excess that may be sold at the real-time price.

The DR event may include a DR event period. The DR event period may include a time period during which the resource is curtailed. The DR event period may include multiple intervals. In some embodiments, DR event assessment may be performed at each of the intervals. For example, the DR event may have a DR event period of three hours with five-minute intervals. The assessment modules 110A-110C may accordingly perform a DR event assessment every five minutes for three hours. For each interval, the assessment modules 110A-110C may read energy economics data from the third party server 112. For example, the assessment modules 110A-110C may read the economics data from the website 126 or may receive a communication from the third party server 112. In the depicted embodiment, at each interval of the DR event period, the assessment modules 110A-110C may read the day-ahead demand, the day-ahead LMP, and a real-time LMP. Alternatively, in some embodiments, the assessment modules 110A-110C may receive or access the economics data from the generator server 142 or another entity that receives and/or calculates the economics data.

Additionally, at each interval, the assessment modules 110A-110C may estimate a real-time energy demand. For example, the assessment modules 110A-110C may receive meter readings from the sites 104 and/or from a resource feeder entity (not shown) such as a meter reading at a substation. The assessment modules 110A-110C may then aggregate the meter readings to estimate the real-time energy demand. In some embodiments, the meter readings may be from an immediately preceding interval. For instance, if the interval for which the DR event is assessed is from 2:00 PM to 2:05 PM, then the meter reading may be from the interval of 1:55 PM to 2:00 PM. In some alternative embodiments, the real-time demand may be estimated using one or more demand forecasting algorithms, read from the third party server 112, read from the generator server 142, or some combination thereof. In these and other embodiments, the economics data and the estimated real-time demand may be used to determine the demand imbalance for one or more of the intervals.

The assessment modules 110A-110C may then select a curtailment request amount for each of the intervals that optimizes profitability of the DR event. The selection of the curtailment request amount may include solving an optimization problem that minimizes the cost of the DR event and takes into consideration changes to the economics data as curtailment occurs. For example, in some embodiments, the assessment modules 110A-110C may forecast a real-time price as a function of the curtailment request amount included in the DR event. As the sites 104 curtail the resource, the demand may correspondingly decrease, which may affect the real-time price. The assessment modules 110A-110C may take the changes to the demand and to the price into consideration when selecting the curtailment request amount.

The assessment modules 110A-110C may additionally calculate a cost of the DR event. The cost of the DR event may also be a function of the curtailment request amount. For example, if the DR event includes a larger curtailment request amount, then the cost of the DR event may be higher than a cost of a DR event that involves a lower curtailment request amount. The selection of the curtailment request amount may be based at least partially on the cost of the DR event. For instance, if the cost of the DR event is greater than a potential profitability, then the assessment modules 110A-110C may determine that the curtailment request amount may be zero and not issue a DR event.

In some embodiments, the curtailment request amount may include an intermediate function based on one or more subsets of the sites 104. For example, the assessment modules 110A-110C may select the curtailment request amount by identifying one or more subsets of the sites 104 capable of curtailing, in aggregate, the curtailment request amount.

The identification may be based on historical data. Some details of the historical data are provided with reference to FIG. 3. Additionally or alternatively, the identification may be based on the location or zone of the sites 104 and/or the customers 102. For example, if the real-time LMP of the resource for the distribution channel 107 increases, then the assessment modules 110A-110C may identify sites (e.g., the first site 104A or the second site 104B) located on the distribution channel 107 to curtail the resource during the DR event. Alternatively, if the real-time LMP of the resource for another distribution channel increases, then the assessment modules 110A-110C may identify sites (e.g., the first site 104A or the second site 104B) located on the distribution channel 107 to curtail the resource during the DR event. The assessment module 110A-110C may accordingly balance demand across multiple distribution channels (e.g., distribution channel 107) to optimize profitability of a DR event.

Additionally or alternatively, the identification may be based the types of control devices at the sites 104. The types of control devices may include control devices that are manually operated by the customer 102 (manual control devices) or control devices that alter operation of an appliance in response to signals sent from the assessment module 110 without action by the customers 102 (automated control devices).

To implement the manual control devices, upon reception of a DR event notification, the customer 102 may manually adjust the manual control device, which in turn adjusts an operation of an appliance controlled by the manual control device. The manual control devices may introduce some variability into the maximum possible curtailment because the customers 102 may not properly operate the manual control devices. Additionally, the manual control devices may be suited for longer periods of time (e.g. 3 hours), because longer periods of time may result in a sufficiently attractive incentive for the customer 102 to manually adjust the manual control device. Additionally, in sites 104 including manual control devices, there may be a latency between receipt of the DR event notification and actual curtailment due to the manual operation by the customer 102.

To implement the automated control devices, the customer 102 may receive a DR event notification. In response, the customer 102 may select or otherwise agree to be controlled without action by the customer 102. Additionally or alternatively, the customer 102 may allow the utility 106 (and/or a DR aggregator in some embodiments) to automatically control the device 130 as long as some predetermined circumstances are met. For instance, when an incentive exceeds a particular threshold, the automated control devices (e.g., a thermostat) may be automatically controlled.

The automated control devices may be more reliable than the manual control devices. Accordingly, in some embodiments the assessment modules 110A-110C may select the sites 104 that have automated control devices before selecting sites 104 that have manual control devices. Additionally, the latency between the DR event notification to curtailment in sites 104 implementing the automated control devices may be shorter than the sites 104 implementing the manual control devices. In addition, in embodiments of the sites 104 implementing the automated control devices, a period during which an appliance is controlled may be shorter (e.g. 5 minutes) and a control frequency may be higher (e.g., multiple times in a day). The automated control devices may be related to DLC programs.

The assessment modules 110A-110C may then notify the subset of sites 104 of the DR event via the network 140. The assessment modules 110A-110C may then collect feedback from the subset of sites 104 regarding compliance with the DR event. Based on the feedback the assessment modules 110A-110C may then estimate potential energy curtailment for the DR event and/or may reevaluate the subset of sites for the current interval and for another interval of the DR event period.

Modifications, additions, or omissions may be made to the distribution system 100 without departing from the scope of the present disclosure. Specifically, embodiments depicted in FIGS. 1A and 1B include one device 130 associated with one customer 102, one DR server 114 associated with the DR aggregator 108 and the utility 106, one distribution channel 107 supplying the resource from one utility 106 and/or one generator 132 to two sites 104, one third party server 112 associated with the third party 134, one generator server 142 associated with one generator 132, and two sites 104 associated with two customers 102. However, the present disclosure applies to a distribution system architecture having multiple devices 130 that may be associated with multiple customers 102, and multiple DR servers 114 associated with multiple DR aggregators 108 or no DR aggregators 108 and multiple utilities 106 or no utilities 106, multiple distribution channels 107 supplying the resource from multiple utilities 106 and/or multiple generators 132 to multiple sites 104, multiple third party servers 112 associated with multiple third parties 134, multiple generator servers 142 associated with multiple generators 132, multiple sites 104 associated with multiple customers 102, or any combination thereof.

Moreover, the separation of various components and servers in the embodiments described herein is not meant to indicate that the separation occurs in all embodiments. Moreover, it may be understood with the benefit of this disclosure that the described components and servers may be integrated together in a single component or server or separated into multiple components or servers.

The assessment modules 110 may include code and routines for DR event assessment. In some embodiments, the assessment modules 110 act in part as a thin-client application that may be stored on the device 130 and in part as components that may be stored on one or more of the DR server 114, the utility 106, the DR aggregator 108, and the sites 104 of the distribution system 100. In some embodiments, the assessment modules 110 may be implemented using hardware including a field-programmable gate array (FPGA) or an application-specific integrated circuit (ASIC). In some other instances, the assessment modules 110 may be implemented using a combination of hardware and software. In some embodiments, the assessment modules 110 may be stored in a combination of the device 130, the sites 104, the utility 106, the DR aggregator 108, and the DR server 114.

In the distribution system 100, memory (e.g., memory included in one or more of the servers 112, 114, the sites 104, and the device 130) may include a non-transitory memory that stores data for providing the functionality described herein. The memory may be included in storage that may be a dynamic random access memory (DRAM) device, a static random access memory (SRAM) device, flash memory, or some other memory devices. In some embodiments, the storage also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 2:
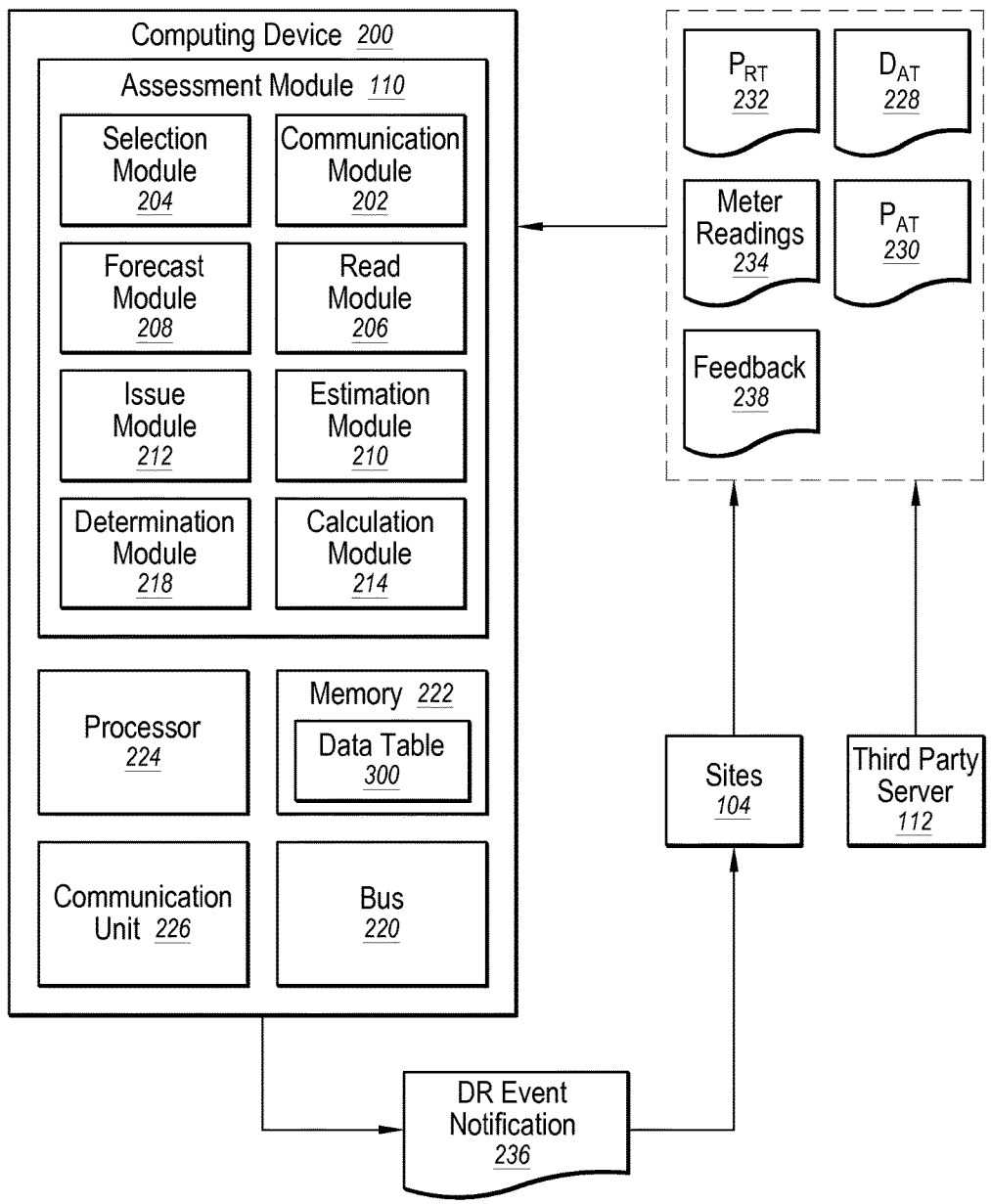
FIG. 2 illustrates an example computing device that may be implemented in the distribution system of FIGS. 1A and 1B.

Referring now to FIG. 2, an example of the assessment module 110 is shown in more detail. FIG. 2 is a block diagram of a computing device 200 that includes the assessment module 110, a processor 224, a memory 222, and a communication unit 226. The components of the computing device 200 may be communicatively coupled by a bus 220. In some embodiments, the computing device 200 may include one or more of the device 130, the DR server 114, the sites 104, the utility 106, and the DR aggregator 108 of the distribution system 100 of FIGS. 1A and 1B.

With combined reference to FIGS. 1B and 2, the processor 224 may include an arithmetic logic unit (ALU), a microprocessor, a general-purpose controller, or some other processor array to perform computations and DR event assessment. The processor 224 may be coupled to the bus 220 for communication with the other components (e.g., 110, 226, and 222). The processor 224 generally processes data signals and may include various computing architectures including a complex instruction set computer (CISC) architecture, a reduced instruction set computer (RISC) architecture, or an architecture implementing a combination of instruction sets. Although FIG. 2 includes a single processor 224, multiple processors may be included in the computing device 200. Other processors, operating systems, and physical configurations may be possible.

The memory 222 may be configured to store instructions and/or data that may be executed by the processor 224. The memory 222 may be coupled to the bus 220 for communication with the other components. The instructions and/or data may include code for performing the techniques or methods described herein. The memory 222 may include a DRAM device, an SRAM device, flash memory, or some other memory device. In some embodiments, the memory 222 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the depicted embodiment, the memory 222 includes a data table 300. The data table 300 may be configured to store historical data relevant to the sites 104. The data table 300 may be configured to enable access to the historical data during the DR event assessment. Additionally, the data table 300 may receive historical data during implementation of the DR events, which may be used in DR event assessments for other intervals of the DR event period, for instance.

The data table 300 is depicted as part of the memory 222 of the computing device 200. In some alternative embodiments, the data table 300 or some portion of the data table 300 may be stored remotely. For example, the data table 300 may be stored in memory of one or more of the DR server 114, the DR aggregator 108, the utility 106, the sites 104, and the device 130. The historical data in the data table 300 may be accessed via the network 140 in these and other embodiments.

The communication unit 226 may be configured to transmit and receive data to and from at least one of the DR server 114, the third party server 112, the device 130, the DR aggregator 108, and the utility 106 depending upon where the assessment module 110 is stored. The communication unit 226 may be coupled to the bus 220. In some embodiments, the communication unit 226 includes a port for direct physical connection to the network 140 or to another communication channel. For example, the communication unit 226 may include a USB, SD, CAT-5, or similar port for wired communication with the components of the distribution system 100. In some embodiments, the communication unit 226 includes a wireless transceiver for exchanging data via communication channels using one or more wireless communication methods, including IEEE 802.11, IEEE 802.16, BLUETOOTH®, or another suitable wireless communication method.

In some embodiments, the communication unit 226 includes a cellular communications transceiver for sending and receiving data over a cellular communications network including via SMS, MMS, HTTP, direct data connection, WAP, e-mail, or another suitable type of electronic communication. In some embodiments, the communication unit 226 includes a wired port and a wireless transceiver. The communication unit 226 may also provide other conventional connections to the network 140 for distribution of files and/or media objects using standard network protocols including transmission control protocol/internet protocol (TCP/IP), HTTP, HTTP secure (HTTPS), and simple mail transfer protocol (SMTP), etc.

In the embodiment of FIG. 2, the assessment module 110 may include a communication module 202, a selection module 204, a read module 206, a forecast module 208, an estimation module 210, an issue module 212, a calculation module 214, and a determination module 218 (collectively, modules of the assessment module 110). One or more of the modules of the assessment module 110 may be implemented as software including one or more routines configured to perform one or more operations. The modules of the assessment module 110 may include a set of instructions executable by the processor 224 to provide the functionality described below. In some instances, the modules of the assessment module 110 may be stored in or at least temporarily loaded into the memory 222 of the computing device 200 and may be accessible and executable by the processor 224. One or more of the modules of the assessment module 110 may be adapted for cooperation and communication with the processor 224 and components of the computing device 200 via the bus 220.

The communication module 202 may be configured to handle communications between the assessment module 110 and other components of the computing device 200 (e.g., 224, 222, and 226). The communication module 202 may be configured to send and receive data, via the communication unit 226, to and from one or more of the device 130, the DR server 114, the third party server 112, the DR aggregator 108, the sites 104, and the utility 106. In some instances, the communication module 202 may cooperate with the other modules (e.g., 204, 206, 208, 210, 212, 214, and 218) to receive and/or forward, via the communication unit 226, data from the components of the distribution system 100.

The read module 206 may be configured to read resource economics data. The economics data may be read for one or more intervals of a DR event period. In the depicted embodiment, the read module 206 may be configured to read a day-ahead demand (in FIG. 2, "$D_{AT}$") 228, a day-ahead LMP (in FIG. 2, "$P_{AT}$") 230, and a real-time LMP (in FIG. 2, "$P_{RT}$") 232 at each interval T. The economics data may be read from the third party server 112 in some embodiments, via the network 140, the communication unit 226, and the communication module 202. The read module 206 may communicate the economics data to the determination module 218.

The estimation module 210 may be configured to estimate a real-time energy demand. The estimation module 210 may be configured to estimate real-time energy demand at one or more intervals of the DR event period. In the depicted embodiment, the estimation module 210 may be configured to estimate the real-time energy demand based on meter readings 234 for each interval of the DR event period. The meter readings 234 may be received by the communication module 202 and communicated to the estimation module 210 in some embodiments. The real-time energy demand for a current interval may be based on the meter readings 234 from an immediately preceding interval. The estimation module 210 may communicate the real-time energy demand to the determination module 218.

The determination module 218 may be configured to determine a demand imbalance. Additionally, the determination module 218 may be configured to determine the demand imbalance at one or more intervals of the DR event period. In the depicted embodiment, the determination module 218 may receive the real-time energy demand and the economics data and may determine the demand imbalance. In some embodiments, the demand imbalance may include an amount of the resource that may be supplied to the sites 104 because the real-time energy demand is greater than the day-ahead demand 228, which may have increased the real-time LMP 232. Alternatively, the demand imbalance may include an excess or potential excess amount of the resource that may be sold by the utility 106 and/or the DR aggregator 108. For example, the real-time LMP 232 may have increased above the day-ahead LMP 230, which may make a sale of an excess amount of the resource profitable or may make implementation of a DR event to create an excess amount of the resource profitable. The determination module may communicate the demand imbalance to the calculation module 214.

The calculation module 214 may be configured to calculate a cost of a DR event that exploits the demand imbalance. The calculation module 214 may calculate the cost of the entire DR event, may calculate the cost for one or more intervals of the DR event period, may calculate a per-unit cost (e.g., per unit of the resource) of the DR event, or some combination thereof. In some embodiments, the cost may include one or more fixed costs and one or more variable costs. For example, the cost of the DR event may include a cost of sending each DR event notification 236, operation costs, and incentives offered to the sites 104 in exchange for curtailment. In some embodiments, the incentives may be at least partially determined by contracts or rules between the sites 104 and the utility 106 and/or the DR aggregator 108. The cost of the DR event may include a convex function in some circumstances or may be modeled as a linear function of the curtailment request amount (e.g., cost of the DR event is equal to a per-unit cost multiplied by the curtailment request amount).

The forecast module 208 may be configured to forecast a real-time price of the resource as a function of curtailment included in the DR event. The forecast module 208 may forecast the real-time price for one or more intervals of the DR event period. In the depicted embodiment, the forecast module 208 may forecast a real-time price for each interval of the DR event period. The forecast module 208 may generate a forecasting function based on a curtailment request amount that results in a forecasted real-time price of the resource. Generally, the lower the curtailment request amount, the less the real-time price is affected by the DR event and the larger the curtailment request amount, the more the real-time price is affected by the DR event. Some examples of the forecasting function may include a logarithm function, a linear function, and a natural logarithm function.

In some embodiments, the selection module 204 may be configured to select a curtailment request amount that optimizes profitability of the DR event. The selection module 204 may select the curtailment request amount for one or more intervals of the DR event period. In the depicted embodiment, the selection module 204 may select the curtailment request amount for each interval of the DR event period. In some embodiments, the selection module may select the curtailment request amount for an interval according to a first selection equation:

$$\max_{0 \le c \le C_T} P'_{RT}(c) \cdot (D_{AT} + c - D_{RT}) - C_{DR}(c)$$

In the first selection equation, a variable c represents the curtailment request amount. The variable T designates the interval in the subscripts (e.g., $D_{AT}$ and $D_{RT}$). The quantity $D_{AT}$ is the day-ahead demand (e.g., the day-ahead demand 228) for the interval. $D_{RT}$ is the estimated real-time demand for the interval. The quantity $C_T$ represents a maximum possible curtailment for the interval. The maximum possible curtailment may be an estimation based on available DR resources such as the sites 104. The maximum possible curtailment may be derived from the historical data stored in the data table 300. Additionally the maximum possible curtailment may depend on the types of control devices (e.g., the manual control devices or the automated control devices) at the sites 104. The function $C_{DR}(c)$ represents a cost function of the DR event. In the first selection equation, the cost function may be based on the curtailment request amount. Additionally or alternatively, the cost function may be based on types of DR program implemented in the distribution system 100 and/or the types of control devices at one or more of the sites 104. The function $P'_{RT}(c)$ represents a real-time price forecasting function. In the first selection equation, the real-time price forecasting function may be based on the curtailment request amount. The function max represents a maximizing function over a range of possible values. Accordingly, the curtailment request amount for the DR event may equal a value between zero and the maximum possible curtailment in which the value of $P'_{RT}(c) \cdot (D_{AT}+c-D_{RT})-C_{DR}(C)$ is maximized. The curtailment request amount may be communicated to the issue module 212.

The issue module 212 may be configured to issue the DR event or not issue the DR event. The issue module 212 may receive the curtailment request amount and determine whether to issue the DR event. For example, in response to the curtailment request amount being equal to zero, the issue module 212 may not issue the DR event. In some embodiments, the cost function of the DR event may be described as a linear function. The linear function may include a per-unit cost multiplied by the curtailment request amount. In these and other embodiments, when the per-unit cost of the DR event is greater than or equal to the real-time price and/or the forecasted real-time price, the curtailment request amount may be equal to zero. Accordingly, the issue module 212 may not issue the DR event. Alternatively, in these and other embodiments, when the per-unit cost is less than the real-time price and/or the forecasted real-time price, the curtailment request amount may have a non-zero value. Accordingly, the issue module 212 may issue the DR event.

To issue the DR event, the issue module 212 may communicate to one or more of the sites 104 DR event notifications 236. The sites 104 may in turn communicate feedback 238 to the computing device 200 via the network 140. The feedback 238 may include whether the one or more sites 104 are participating in the DR event, acknowledgements that the sites 104 received the DR event notifications 236, whether the sites complied with the DR event, or some combination thereof. The feedback 238 may be stored in the data table 300.

In some embodiments, instead of selecting a particular curtailment request amount, the selection module 204 may be configured to identify the subset of the customers 102 or of the sites 104 capable of curtailing an optimal curtailment request amount. The selection module 204 may identify the subset of the customers 102 based upon the historical data stored in the data table 300. The selection module 204 may identify the subset of the customers 102 based upon the type of control devices at each site. In these and other embodiments, the selection module 204 may select the curtailment request amount for an interval according to second selection equations:

$$\max_{\overline{U}_T \notin \overline{SU_T}} P'_{RT}(c) \cdot (D_{AT} + c - D_{RT}) - C_{DR}(c)$$

$$c = \sum_{u \in \overline{U}_t} E[cur(u)]$$

In the second selection equations, the quantities $D_{AT}$, $D_{RT}$, the variable T (in the subscripts), and the functions max, $C_{DR}(c)$, and $P'_{RT}(c)$ are the same as those described with reference to the first selection equation. The variable u represents the customer 102 or the site 104. $U_T$ represents a subset of the customers 102 and/or a subset of the sites 104 selected at the interval. $SU_T$ represents a second subset of the customers 102 or a second subset of the sites 104 that have been contacted during a particular time period (e.g., one operational day). $U_T$ and $SU_T$ are represented as vectors in the second selection equation. E[cur(u)] represents an estimated curtailment of the customer 102 or of the site 104. The operator $\epsilon$ represents a membership function. The operator $\epsilon$ with a / represents a non-membership function. In the second selection equations, c represents a curtailment request amount as a sum of the estimated curtailments of the customers 102 or the sites 104 included in the subset of the customers 102 or the subset of the sites 104 ($U_T$). Accordingly, the curtailment request amount for the DR event may equal a subset of the customers 102 or a subset of the sites 104 ($U_T$), which have been contacted during a particular time period, in which the value of $P'_{RT}$ (c)·($D_{AT}$+c−$D_{RT}$)− $C_{DR}$(C) is maximized. Solving the second selection equations may be performed using a greedy algorithm (heuristic algorithm).

The selection module 204 may then communicate the curtailment request amount and the subset of the customers 102 or the subset of the sites 104 to the issue module 212. The issue module 212 may determine whether to issue the DR event. In response to a determination to issue the DR event, the issue module 212 may notify the subset of the customers 102 or the subset of the sites 104. For example, the issue module 212 may communicate the DR event notification 236 to the subset of the customers 102 or the subset of the sites 104 via the network 140. As above, the subset of the customers 102 or the subset of the sites 104 may in turn communicate the feedback 238 to the computing device 200 via the network 140, which may be stored in the data table 300.

In some embodiments, the feedback 238 may be communicated to the estimation module 210. The estimation module may estimate potential resource curtailment for the DR event or the interval based on the feedback. Additionally, the feedback may be communicated to the selection module 204. The selection module 204 may then reevaluate the subset of the sites 104 or the subset of the customers 102 based on the feedback for a current interval or for an additional interval of the DR event period.

FIG. 3 illustrates an example embodiment of the data table 300 that may be implemented in the computing device 200 of FIG. 2. The data table 300 may include one or more parameters 350 that describe characteristics of customers or sites. Some of the parameters 350 may include or be derived from historical data, feedback from the sites or the customers, capabilities of a distribution system, or some combination thereof. Some of the parameters 350 may be interval-based. For example, some of the parameters 350 may be calculated or re-calculated at one or more intervals of a DR event period. The parameters 350 in the data table 300 pertain to five customers or sites. The customers or the sites may be substantially similar to and/or correspond to the customers 102 and the sites 104 discussed with reference to FIGS. 1A-2. In other embodiments, the data table may pertain to more than five or fewer than five customers or sites. The data table 300 may be included in a distribution system in which electricity is supplied to the sites. In alternative embodiments, the data table 300 may be included in a distribution system in which another resource is supplied to the sites.

In the data table 300, the parameters 350 may include a customer ID 302, a maximum potential curtailment 304, a likelihood of participation 306, a reliability 308, an average past performance 310, a past curtailment performance 312, an estimated curtailment 314, a DR cost 316, a number of notifications 318, a previously-called indication 320, a location 322, and a control device type 324. Each of the parameters 350 is described below.

The customer ID 302 may be used to identify a customer or a site. For example, with combined reference to FIGS. 1B and 3, the first site 104A may be designated with a first customer ID 302A and the second site 104B may be designated with a second customer ID 302B. Additionally or alternatively, the customer ID 302 may be designated to the customers 102.

The maximum potential curtailment 304 may include a maximum amount of electricity that may be curtailed at a particular site or by a particular customer. The maximum potential curtailment 304 may be used to derive the maximum possible curtailment ($C_T$) of the first selection equation. The maximum potential curtailment 304 may be calculated for one or more intervals. For instance, the maximum potential curtailment 304 may be calculated as a difference between a maximum demand at a historically similar interval and a minimum demand at a historically similar interval.

The type of control device 324 indicates the type of control device at each site. The type of control device 324 may include automated control device ("automated" in FIG. 3) or manual control device ("manual" in FIG. 3). As discussed above, the automated control devices may affect operation of an appliance controlled by the control device without input by a customer. The automated control device may include smart appliances, for instance. The manual control devices may use input by the customer to affect operation of the appliance.

The likelihood of participation 306 may include a percentage that characterizes a chance that a customer or a site may participate in a DR event. The likelihood of participation 306 may include a ratio of a number of DR events a customer or a site participated in divided by a number of DR event notifications received by the customer or site as indicated by acknowledgments, for instance. The likelihood of participation 306 may be based on a number of times a customer or site has participated under similar circumstances. Alternatively, the likelihood of participation 306 may be based on a baseline energy usage of a particular customer or site versus an actual energy usage of the particular customer or site. Additionally or alternatively, the likelihood of participation 306 may be based on the type of control device 324.

The reliability 308 may include a percentage indicating how frequently a customer or a site complies with energy curtailment (e.g., curtails an agreed-to amount) included in a DR event when the customer or the site opts into the DR event. Additionally or alternatively, the reliability 308 may depend on the type of control device 324.

The average past performance 310 may include a percentage of the maximum potential curtailment 304 a customer or a site curtails on average. The past curtailment performance 312 may include an average energy curtailment request amount. The estimated curtailment 314 may include a product of the maximum potential curtailment 304, the likelihood of participation 306, the reliability 308, and the average past performance 310.

The DR cost 316 may include a cost to contract and/or an incentive that may be transferred to a customer if the customer participates and complies in a DR event. The DR cost 316 may, additionally or alternatively, depend on the type of control device 324. The DR cost 316 may be used to determine a cost of a DR event and/or a cost function. The previously called indication 320 may indicate whether a customer or site has been contacted during a particular time period. The previously called indication 320 may be used to create the second subset of the customers or sites that have been contacted during a particular time period ($SU_T$) described with reference to the second selection equations. The location 322 may indicate a particular zone (e.g., the distribution channel 107 of FIGS. 1A and 1B) in which a customer or a site is located. Accordingly, the DR event assessment may be performed with respect to sites or customers in a specific location or in specific locations.

With combined reference to FIGS. 2 and 3, solving the first or the second equations by the selection module 204 may be performed using a greedy algorithm (heuristic algorithm) and one or more of the parameters 350 in the data table 300. For example, one or more of the parameters 350 may be individually substituted into the equation $P'R_T(c)\cdot(D_{AT}+c-D_{RT})-_{DR}(C)$ described above. The customers or the sites may be sorted according to a result and selected according to the best result (e.g., the highest resulting profit).

Additionally or alternatively, the subset of customers ($U_T$) may include multiple potential customers or sites from the data table 300. The subset of customers ($U_T$) may include customers or sites that do not have the previously called indication 320. The issue module 212 may notify the multiple potential customers or sites. The feedback may include which of the multiple potential customers or sites may participate in the DR event. Based on the feedback, the issue module 212 may select one or more of the multiple potential customers or sites based on one or more of the parameters 350 included in the data table 300. The subset of customers or sites ($U_T$) and the second subset of the customers or sites that have been contacted during a particular time period ($SU_T$) may be updated in the data table 300.

Figure 4:
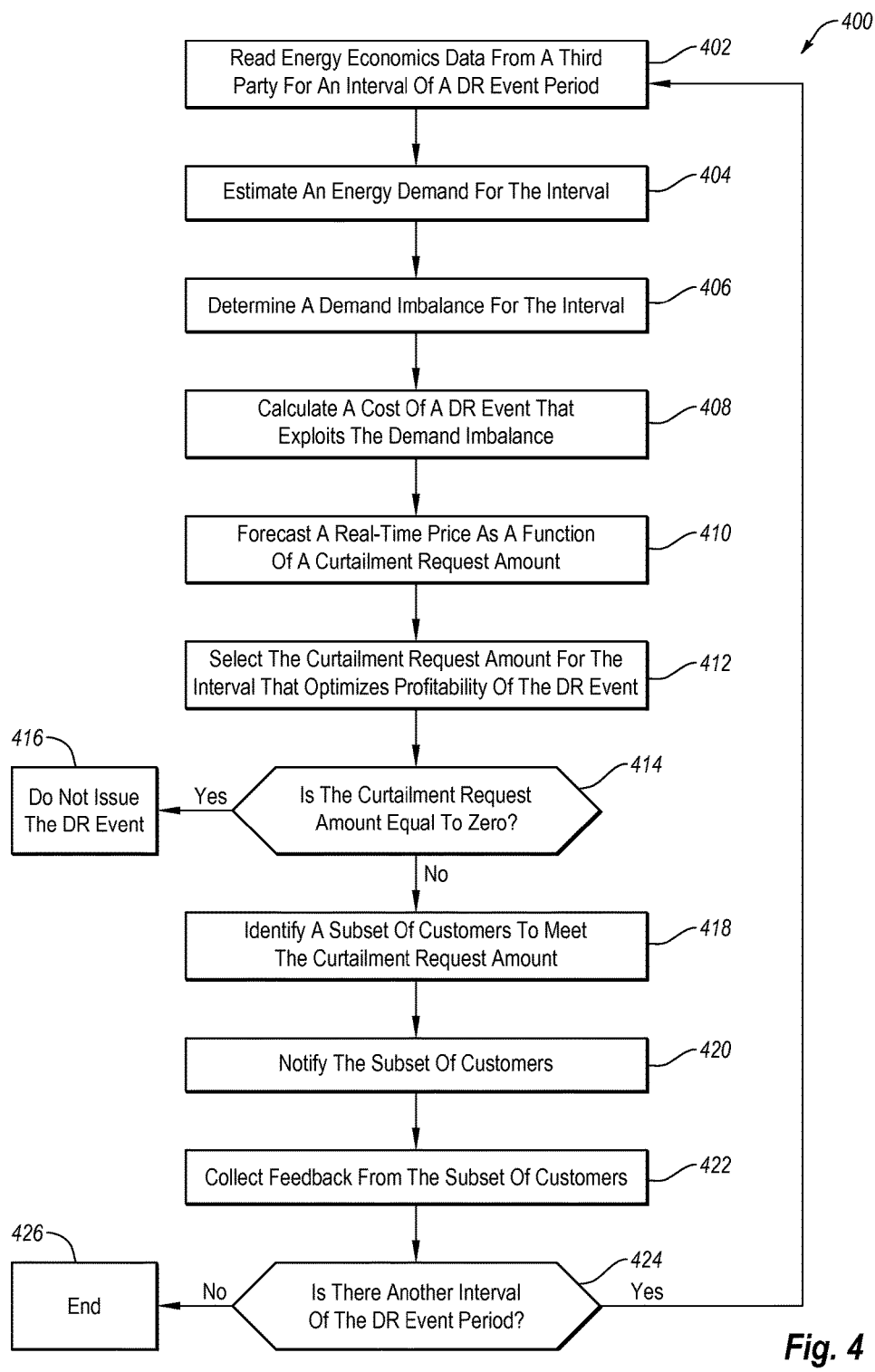
FIG. 4 is a flow diagram of an example method of demand response event assessment, all arranged in accordance with at least one embodiment described herein.

FIG. 4 is a flow diagram of an example method 400 of DR event assessment, arranged in accordance with at least one embodiment described herein. The method 400 may be performed in a distribution system such as the distribution system 100 of FIGS. 1A and 1B in which the utility 106 supplies electricity to the sites 104. Analogous methods may be implemented in distribution systems in which the utility 106 supplies another resource to the sites 104.

The method 400 may be programmably performed in some embodiments by the computing device 200 described with reference to FIG. 2. Additionally or alternatively, the method 400 may be programmably performed by the DR server 114, the utility 106, the DR aggregator 108, or some combination thereof. One or more of the DR server 114, the utility 106, the DR aggregator 108, and the computing device 200 may include or may be communicatively coupled to a non-transitory computer-readable medium (e.g., the memory 222 of FIG. 2) having stored thereon or encoded therein programming code or instructions that are executable by a processor to perform or cause performance of the method 400. Additionally or alternatively, one or more of the DR server 114, the utility 106, the DR aggregator 108, and the computing device 200 may include a processor (e.g., the processor 224 of FIG. 2) that is configured to execute computer instructions to cause or control performance of the method 400. Although illustrated as discrete blocks, various blocks may be divided into additional blocks, combined into fewer blocks, or eliminated, depending on the desired implementation.

At block 402, for an interval of a DR event period, energy economics data may be read from a third party. The energy economics data may include a day-ahead demand, a day-ahead LMP, and a real-time LMP. For example, with reference to FIG. 1B, the DR server 114 may read the economics data from the third party server 112.

At block 404, an energy demand may be estimated for the interval. The energy demand may be estimated based on aggregation of meter readings in some embodiments. For example, with reference to FIG. 1B, meter readings may be communicated from the sites 104 to the DR server 114. The DR server 114 may receive the meter readings and estimate the energy demand based thereon. In some embodiments, the meter readings may be from a previous interval immediately preceding the interval. Alternatively or additionally, the energy demand may be estimated for the interval by the meter readings at the aggregated points such as feeders or substations.

At block 406, a demand imbalance may be determined for the interval. For example, with reference to FIG. 1B, the demand imbalance may include an excess of energy that may be sold in the distribution system 100 or may include a shortfall in energy provided to the sites 104.

At block 408, a cost may be calculated of a DR event that exploits the demand imbalance. For example, with reference to FIG. 2, the cost of a DR event may be calculated by the calculation module 214. The cost of a DR event may include a cost function based on a curtailment request amount (e.g., $C_{DR}(c)$) described with reference to the first and the second selection equations. The cost function may be a linear function in some embodiments including a per-unit cost. In these and other embodiments, the per-unit cost may be calculated. Alternatively, the cost function may depend on the pre-agreed contract between customers and utility. For instance, a fixed payment is made to customers when certain curtailment has been made by the customer. Additionally, it may be determined whether the per-unit cost is greater than the real-time LMP. In response to the per-unit cost being greater than the real-time LMP, the DR event may not be issued.

At block 410, a real-time price may be forecast as a function of a curtailment request amount. In some embodiments, the real-time price may be forecast using a real-time price forecasting function. The real-time price forecasting function may include a logarithm function or another function configured to represent changes to the real-time price of energy as a function of a curtailment request amount included in the DR event.

At block 412, the curtailment request amount may be selected for the interval. In some embodiments, the curtailment request amount may be selected according to the first selection equation:

$$\max_{0 \leq c \leq C_T} P'_{RT}(c) \cdot (D_{AT} + c - D_{RT}) - C_{DR}(c)$$

Alternatively, the curtailment request amount may be selected according to the second selection equations:

$$\max_{\overline{U_T} \notin \overline{SU_T}} P'_{RT}(c) \cdot (D_{AT} + c - D_{RT}) - C_{DR}(c)$$

$$c = \sum_{u \in \overline{U}_t} E[cur(u)]$$

For example, with reference to FIG. 2, the selection module 204 may select the curtailment request amount based on the first selection equation or the second selection equations.

At block 414, it may be determined whether the curtailment request amount is equal to zero. At block 416, the DR event may not be issued in response to the curtailment request amount being equal to zero ("yes" at block 414). For example, the curtailment request amount may equal zero when the per-unit cost of the DR event is greater than the real-time LMP.

Alternatively, at block 418 and in response to the curtailment request amount not being equal to zero ("No" at block 414), a subset of customers may be identified to meet the curtailment request amount. For example, with reference to FIG. 1B, the second customer 102B may be identified to meet the curtailment request amount. In some embodiments, identifying the subset of customers may be based at least partially on historical data. Additionally or alternatively, the subset of customers may be identified at least partially based on the on a type of control device at a site associated with each of the subset of customers.

At block 420, the subset of customers may be notified. For example, with reference to FIG. 1B, the DR server 114 may communicate a DR event notification to the device 130 associated with the second customer 102B via the network 140.

At block 422, feedback may be collected from the subset of customers. For example, with reference to FIG. 1B, the DR server 114 may receive feedback from the device 130 via the network 140. In some embodiments, based on the feedback, potential energy curtailment for the DR event may be estimated. Additionally or alternatively, based on the feedback, the subset of customers may be reevaluated for the interval and for another interval of the DR event period.

At block 424, it may be determined whether another interval of the DR event period remains. In response to no intervals remaining ("No" at block 424), the method 400 may proceed to block 426 where the method 400 ends. Alternatively, in response to another interval remaining, the method 400 may progress through one or more of blocks 402, 404, 406, 408, 410, 412, 414, 416, 418, 420, and 422 as described above for the other intervals.

For example, the method 400 may include reading a day-ahead demand, a day-ahead LMP for the other interval, and a real-time LMP for the other interval. Additionally, for the other interval, an energy demand may be estimated, the demand imbalance may be determined, and an additional energy curtailment request amount may be selected that optimizes profitability of the DR event for the other interval.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data, which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method of computer-based demand response (DR) assessment, the method comprising:

reading energy economics data from a third party for a current interval of a DR event period, the energy economics data including a real-time locational marginal pricing (LMP) that accounts for energy demand in a real-time market;

estimating a real-time energy demand for the current interval, the real-time energy demand for the current interval is based on meter readings for an immediately preceding interval measured at a plurality of sites associated with a plurality of customers;

based on the energy economics data and the estimated real-time energy demand, determining a demand imbalance for the current interval;

calculating a per-unit cost of a DR event that exploits the demand imbalance for the current interval;

selecting an energy curtailment request amount for the current interval that minimizes a cost of the DR event for the current interval and takes into consideration estimated curtailment of each of the plurality of customers and changes to the energy economics data as energy curtailment occurs, wherein the energy curtailment request amount is based on a difference between a cost function of the DR event applied to the energy curtailment request amount and a product of a real-time price forecasting function applied to the energy curtailment request amount and a sum of a day-ahead demand for the current interval, the energy curtailment request amount, and an opposite of an estimated real-time energy demand for the current interval;

forecasting a real-time price as a function of the energy curtailment request amount; and when the per-unit cost for the current interval is less than the real-time price and the forecasted real-time price:
identifying a subset of customers associated with a subset of sites capable of curtailing the energy curtailment request amount, and
notifying the subset of customers to automatically implement the DR event for the current interval among the subset of sites associated with the identified subset of customers,
wherein automatic implementation of the DR event for the current interval includes communication of a control command that controls an automated operation of at least one of the subset of sites associated with at least one of the identified subset of customers to automatically curtail energy usage at the site without action by the identified customers.

2. The method of claim 1, the method further comprising:
determining whether the per-unit cost is greater than the real-time LMP for the current interval; and
in response to the per-unit cost being greater than the real-time LMP, not issuing the DR event.

3. The method of claim 1, wherein the selecting is performed according to an equation:

$$\max_{0 \leq c \leq C_T} P'_{RT}(c) \cdot (D_{AT} + c - D_{RT}) - C_{DR}(c),$$

wherein
c represents the energy curtailment request amount as a variable;
$C_{DR}(c)$ represents the cost function of the DR event;
$P'_{RT}(c)$ represents the real-time price forecasting function;
max represents a maximizing function;
$D_{AT}$ represents a day-ahead demand for the current interval;
$D_{RT}$ represents the estimated real-time energy demand for the current interval; and
$C_T$ represents a maximum possible curtailment.

4. The method of claim 1, further comprising collecting feedback from the subset of customers regarding compliance with the DR event.

5. The method of claim 4, further comprising based on the feedback:
estimating potential energy curtailment for the DR event; and
reevaluating the subset of customers for the current interval and for another interval of the DR event period.

6. The method of claim 4, wherein the selecting is performed according to equations:

$$\max_{U_T \notin SU_T} P'_{RT}(c) \cdot (D_{AT} + c - D_{RT}) - C_{DR}(c); \text{ and}$$

$$c = \sum_{u \in U_T} E[cur(u)],$$

wherein
u represents a customer;
$C_{DR}(c)$ represents the cost function of the DR event;
$P'_{RT}(c)$ represents the real-time price forecasting function;
$U_T$ represents the subset of customers;
$SU_T$ represents a second subset of customers that have been contacted during a particular time period;
$E[cur(u)]$ represents the estimated curtailment of one of the plurality of customers; and
$\epsilon$ represents a membership function.

7. The method of claim 4, wherein the identifying is based at least partially on a type of control device at a site associated with each of the subset of customers.

8. The method of claim 1, further comprising for another interval of the DR event period:
reading a day-ahead demand, a day-ahead LMP, and a real-time LMP;
estimating an energy demand for the other interval;
determining the demand imbalance for the other interval; and
selecting an additional energy curtailment request amount that optimizes profitability of the DR event for the other interval.

9. The method of claim 1, further comprising, in response to the energy curtailment request amount equaling zero, not issuing the DR event.

10. A non-transitory computer-readable medium having encoded therein programming code executable by a processor to perform operations comprising:
reading energy economics data from a third party for a current interval of a DR event period, the energy economics data including a real-time locational marginal pricing (LMP) that accounts for energy demand in a real-time market;
estimating a real-time energy demand for the current interval, the real-time energy demand for the current interval is based on meter readings for an immediately preceding interval measured at a plurality of sites associated with a plurality of customers;
based on the energy economics data and the estimated real-time energy demand, determining a demand imbalance for the current interval;
calculating a per-unit cost of a DR event that exploits the demand imbalance for the current interval;
selecting an energy curtailment request amount for the current interval that minimizes a cost of the DR event for the current interval and takes into consideration estimated curtailment of each of the plurality of customers and changes to the energy economics data as energy curtailment occurs, wherein the energy curtailment request amount is based on a difference between a cost function of the DR event applied to the energy curtailment request amount and a product of a real-time price forecasting function applied to the energy curtailment request amount and a sum of a day-ahead demand for the current interval, the energy curtailment request amount, and an opposite of an estimated real-time energy demand for the current interval;
forecasting a real-time price as a function of the energy curtailment request amount; and when the per-unit cost for the current interval is less than the real-time price and the forecasted real-time price:
identifying a subset of customers associated with a subset of sites capable of curtailing the energy curtailment request amount, and
notifying the subset of customers to automatically implement the DR event for the current interval among the subset of sites associated with the identified subset of customers,
wherein automatic implementation of the DR event for the current interval includes communication of a control command that controls an automated operation of at least one of the subset of sites associated with at least one of the identified subset of customers to automatically curtail energy usage at the site without action by the identified customers.

11. The non-transitory computer-readable medium of claim 10, wherein
the operations further comprise:
determining whether the per-unit cost is greater than the real-time LMP for the current interval; and
in response to the per-unit cost being greater than the real-time LMP, not issuing the DR event.

12. The non-transitory computer-readable medium of claim 10, wherein the selecting is performed according to an equation:

$$\max_{0 \le c \le C_T} P'_{RT}(c) \cdot (D_{AT} + c - D_{RT}) - C_{DR}(c),$$

wherein
c represents the energy curtailment request amount as a variable;
$C_{DR}(c)$ represents the cost function of the DR event;
$P'_{RT}(c)$ represents the real-time price forecasting function;
max represents a maximizing function;
$D_{AT}$ represents a day-ahead demand for the current interval;
$D_{RT}$ represents the estimated real-time energy demand for the current interval; and
$C_T$ represents a maximum possible curtailment.

13. The non-transitory computer-readable medium of claim 10, wherein the operations further comprise collecting feedback from the subset of customers regarding compliance with the DR event.

14. The non-transitory computer-readable medium of claim 13, wherein the operations further comprise, based on the feedback:
estimating potential energy curtailment for the DR event; and
reevaluating the subset of customers for the current interval and for another interval of the DR event period.

15. The non-transitory computer-readable medium of claim 13, wherein the selecting is performed according to equations:

$$\max_{\overline{U_T} \notin \overline{SU_T}} P'_{RT}(c) \cdot (D_{AT} + c - D_{RT}) - C_{DR}(c); \text{ and}$$

$$c = \sum_{u \in \overline{U}_t} E[cur(u)],$$

wherein
u represents a customer;
$C_{DR}(c)$ represents the cost function of the DR event;
$P'_{RT}(c)$ represents the real-time price forecasting function;
$U_T$ represents the subset of customers;
$SU_T$ represents a second subset of customers that have been contacted during a particular time period;
$E[cur(u)]$ represents the estimated curtailment of one of the plurality of customers; and
$\epsilon$ represents a membership function.

16. The non-transitory computer-readable medium of claim 13, wherein the identifying is based at least partially on a type of control device at a site associated with each of the subset of customers.

17. The non-transitory computer-readable medium of claim 10, wherein the operations further comprise, for another interval of the DR event period:
reading a day-ahead demand, a day-ahead LMP, and a real-time LMP;
estimating an energy demand for the other interval;
determining the demand imbalance for the other interval; and
selecting an additional energy curtailment request amount that optimizes profitability of the DR event for the other interval.

18. The non-transitory computer-readable medium of claim 10, wherein the operations further comprise, in response to the energy curtailment request amount equaling zero, not issuing the DR event.

* * * * *